United States Patent [19]
Venkat

[11] Patent Number: 5,857,083
[45] Date of Patent: Jan. 5, 1999

[54] BUS INTERFACING DEVICE FOR INTERFACING A SECONDARY PERIPHERAL BUS WITH A SYSTEM HAVING A HOST CPU AND A PRIMARY PERIPHERAL BUS

[75] Inventor: Giridhar G. Venkat, San Jose, Calif.

[73] Assignee: Yamaha Corporation, Hamamatsu, Japan

[21] Appl. No.: 663,006

[22] Filed: Jun. 7, 1996

[51] Int. Cl.$^6$ .............................. G06F 13/00; G06F 13/40
[52] U.S. Cl. ........................... 395/309; 395/306; 395/308
[58] Field of Search .................................. 395/280, 306, 395/308, 309, 281, 823

[56] References Cited

U.S. PATENT DOCUMENTS

| 5,568,619 | 10/1996 | Blackledge et al. | 395/281 |
| 5,638,334 | 6/1997 | Farmwald et al. | 365/230.03 |

OTHER PUBLICATIONS

"Computers & Peripherals, " EDN, Apr. 25, 1996, pp. 193–197.
"Embedded Systems," EDN, Apr. 25, 1996, p. 189.
"PCI Local Bus Specification, " PCI Special Interest Group, Revision 2.1, Jun. 1, 1995, Chapters 1–3, and 6, and appendix B.
"Products from the PCI Show," EDN, Apr. 25, 1996, pp. 99–114.
Quinnell, Richard A., "The Mighty Morphin'PCI Bus," EDN, Apr. 25, 1996, pp. 58–68.
Schweber, Bill, "PCI Mezzanine Card Includes Data Transfer, DSP Capability," EDN, Apr. 25, 1996, p. 44.
Wright, Maury, "Coalition Defines Standard for PC–Motherboard Design," EDN, Apr. 25, 1996. p. 36.

*Primary Examiner*—Meng-Ai T. An
*Assistant Examiner*—Rupal D. Dharia
*Attorney, Agent, or Firm*—Pillsbury Madison & Sutro LLP

[57] ABSTRACT

A bus interface device for interfacing a secondary peripheral bus with a system having a host CPU and a primary peripheral bus. The bus interface enables "virtual integration" of multiple physically distinct peripheral devices so that the collection of devices can function as a single integrated unit. The "virtually integrated" devices can share resources such as a dedicated bus, memory space, and memory bandwidth just as if the devices were physically integrated. An intelligent device configuration process and a dynamic internal memory map allow each peripheral device to be independently added to the system, removed from the system, or upgraded just as if each device was a completely separate peripheral. In this way, flexibility and modularity are maintained while achieving the advantages and memory cost reductions associated with physically integrated devices. Additionally, the bus interface provides a dedicated secondary bus that enables multimedia and graphics bus traffic to be isolated from the CPU's primary peripheral bus. This separation allows the CPU's peripheral bus to provide sufficient bandwidth for all peripheral devices and allows room for the system to be upgraded with new or faster peripherals. The dedicated bus can also offer multimedia devices the higher bandwidth they require for applications such as 3-D graphics, digital audio, and motion video.

18 Claims, 13 Drawing Sheets

| | | Reg. pair |
|---|---|---|
| SB DEVICE 1 | Base Address BAR1 / Size SR1 | 1 |
| | BAR2 / SR2 | 2 |
| | ⋯ ⋯ | 3 |
| | ⋯ ⋯ | 4 |
| SB DEVICE 2 — 1 | BAR1 / SR1 | 5 |
| SB DEVICE 2 — 2 | BAR2 / SR2 | 6 |
| SB DEVICE 2 — 3 | BAR3 / SR3 | 7 |
| SB DEVICE 2 — 4 | BAR4 / SR4 | 8 |
| SB DEVICE 3 | ⋯ ⋯ | 9 |
| | ⋯ ⋯ | 10 |
| | ⋯ ⋯ | 11 |
| | ⋯ ⋯ | 12 |
| SB DEVICE 4 | ⋯ ⋯ | 13 |
| | ⋯ ⋯ | 14 |
| | BAR3 / SR3 | 15 |
| | Base Address BAR4 / Size SR4 | 16 |

FIG. 7

BUS INTERFACING DEVICE FOR INTERFACING A SECONDARY PERIPHERAL BUS WITH A SYSTEM HAVING A HOST CPU AND A PRIMARY PERIPHERAL BUS

FIELD OF THE INVENTION

The present invention relates to a bus interfacing device, and more specifically to a bus interface that can connect with multiple peripheral devices and present these devices to the bus as a single device having the functions of all of the peripheral devices.

BACKGROUND OF THE INVENTION

The PCI (Peripheral Component Interconnect) bus is a standardized local-bus that is used for connection between a CPU and its peripherals. At its inception, the PCI bus was designed to allow for motherboard connection of high-speed peripherals. Soon thereafter, the PCI bus began to replace the ISA local-bus as the bus used to connect add-in cards to the motherboard CPU. The PCI bus now dominates the desktop PC (personal computer) market as the primary way of connecting peripherals to the CPU, and variants of the standard PCI bus have evolved for industrial, compact, and mobile applications.

The PCI bus and peripherals connected to the bus operate in accordance with the PCI specification, which is published by the PCI Special Interest Group ("SIG"). Because it is processor-independent, any CPU or peripheral can be connected to the bus. In accordance with revision 2.1 of the specification, the PCI bus provides a 32-bit data path running at a 33 MHz clock rate for a maximum bandwidth of 132 megabytes per second ("MB/s"). Definitions for 64-bit data path and 66 MHz clock rate options are also included in the current specification. This combination of speed and flexibility has made the PCI bus the standard interconnection method between peripherals and a host CPU.

FIG. 11 shows a block diagram of the arrangement of a host CPU and add-on peripherals in a conventional PC. The conventional PC is implemented on a motherboard MB and includes a central processing unit CPU and its associated main memory M0, which is a large block of DRAM. A cache of fast memory SRAM, logic control chip set, and CPU bus are also provided on the motherboard MB along with a PCI bus. Peripherals (C1, C2, and C3), each in the form of an add-in card, are connected to the motherboard PCI bus. In this example, the peripherals consist of an MPEG2 decoder C3, a 3-D graphics accelerator C2, and a combination 2-D graphics accelerator and VGA controller C1. The VGA controller C1 is connected to a monitor CRT. An ISA bridge may also be provided to allow ISA-based peripherals to be connected to the system.

As shown in FIG. 11, each add-on peripheral (C1, C2, or C3) can only transfer data to or from another peripheral, or to or from the large main memory M0, by using the PCI bus. However, the PCI bus may not be able to provide the type of performance required by high-bandwidth multimedia and graphics peripherals for applications such as 3-D graphics, digital audio, and motion video. For example, the three add-in cards shown in FIG. 11 will find it extremely difficult, if not impossible, to operate together over the motherboard PCI bus. While the theoretical maximum bandwidth of the PCI bus is 132 MB/s, typical sustainable throughput on the bus ranges from 40 to 80 MB/s due to factors such as bus contention. Meanwhile, for 3-D graphics, the stream of 3-D polygon information coming from the CPU can range from 10 to 15 MB/s and the resulting rendered pixel stream from the 3-D accelerator C2 will be in the range of 40 MB/s. Thus, even if the 3-D graphics accelerator has its own memory and the ability to transfer data directly to screen memory, 3-D graphics alone requires a bandwidth of over 50 MB/s.

In the case of motion video, the compressed data stream going to the MPEG2 decoder C3 is only about 1 MB/s but the uncompressed video stream is around 30 MB/s. Additionally, these two graphics applications must contend for bus bandwidth along with other transactions required for applications such as audio, CD-ROM access, hard disk access, and joystick or controller input. In fact, providing multimedia peripherals with the necessary bandwidth is made even more difficult because all requests for the PCI bus are handled based on a fairness algorithm (i.e., all peripherals have the same priority when requesting access to the PCI bus). Even if the motherboard PCI bus in a conventional PC system could provide the bandwidth required by all of the connected peripherals, it is apparent that the multimedia traffic saturates the PCI bus. In the long run, such overburdening of the PCI bus compromises system performance and makes further system upgrades impossible.

Additionally, this type of add-on architecture requires a great deal of single function memory. In order to minimize required bus bandwidth and to increase its own speed, each multimedia add-on peripheral typically has an on-card dedicated RAM memory that it can use during data processing. A major drawback exists in that the RAM provided on each peripheral card cannot be reused or reallocated for other purposes—it is single-function memory. For example, the MPEG2 decoder C3 and the 3-D graphics accelerator C2 shown in FIG. 11 each require about 2 MB of dedicated memory M3 and M2, respectively, in addition to the multi-megabyte screen memory M1 provided with the VGA controller C1. Such large single-function memories are costly and wasteful and lead to add-on peripherals that are too expensive and inflexible.

To overcome some of the bandwidth problems discussed above, physically integrated devices that combine several independent features into a single add-on peripheral card have been developed. While a physically integrated device may lower the amount of bandwidth required on the motherboard PCI bus, such a design greatly sacrifices modularity. A typical integrated device is designed to include circuitry to perform many functions. Even if only a subset of these functions is desired by a user, the cost of the device is the same because all of the functions are part of a single physical component and cannot be broken up. Thus, both the integrated device and the corresponding single peripherals must be available to satisfy different price ranges and performance levels in the marketplace. Further, for each combination of features that is desired to be integrated, a separate and distinct integrated device must be designed, produced, and supported.

Thus, in a conventional PC, multimedia peripherals connected to the motherboard PCI bus saturate the PCI bus and are expensive due to large single-function memories and/or a lack of modularity. Furthermore, the PCI bus may not be able to provide the bandwidth presently required by a modest combination of multimedia peripherals—let alone accommodate future upgrades to the system to improve performance or provide additional functions.

SUMMARY OF THE INVENTION

In view of these problems, it is an object of the present invention to remove the above-mentioned drawbacks and to provide a bus interface that enables "virtual integration" of multiple physically distinct peripheral devices so that the collection of devices functions as a single unit. The "virtually integrated" devices can share resources such as a dedicated bus, memory space, and memory bandwidth just as if the devices were physically integrated. However, each peripheral device can be independently added to the system, removed from the system, or upgraded just as if each device was a completely separate peripheral. In this way, flexibility and modularity are maintained while achieving the advantages and memory cost reductions associated with physically integrated devices.

Another object of the present invention is to provide a bus interface that allows multiple distinct peripheral devices to share resources such as a memory space and a dedicated bus. Such sharing decreases the cost and complexity of each additional peripheral device.

Yet another object of the present invention is to provide a dedicated bus that enables multimedia and graphics bus traffic to be isolated from the CPU's peripheral bus. This separation allows the CPU's peripheral bus to provide sufficient bandwidth for all peripheral devices and allows room for the system to be upgraded with new or faster peripherals.

Another object of the preset invention is to provide a dedicated bus that can provide the high bandwidth required by multimedia devices for applications such as 3-D graphics, digital audio, and motion video. Still another object of the present invention is to provide a dedicated bus that uses a dynamic priority scheme to determine which device gets access to the bus when multiple devices request the bus. This allows a device that comes to require a high bandwidth to be assigned a high priority so that it can be guaranteed access to the bus.

According to a first embodiment of the present invention, a bus interface device is provided for interfacing a secondary peripheral bus, which can be connected to secondary peripheral devices, with a host system having a CPU and a primary peripheral bus. The first embodiment includes: means for determining which secondary peripheral devices are connected to the secondary peripheral bus, address range registers for storing address ranges of the connected secondary peripheral devices, address determining means for determining whether an address on the primary peripheral bus is an address of one of the connected secondary peripherals, read/write register means for storing addresses and data from the primary peripheral bus determined by the address determining means to be intended for a connected secondary peripheral device, means for controlling the flow of addresses and data on the secondary peripheral bus, and means for controlling the flow of addresses and data stored in the read/write register means onto the secondary peripheral bus. In the first embodiment of the present invention, the bus interface device makes the secondary peripheral bus invisible to the host system while making the secondary peripheral devices visible.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the gist of the present invention.

BRIEF DESCRIPTION OF THE DRAWINGS

FIG. 7 is a block diagram showing internal registers of the bus interface device in an embodiment of the present invention;

DETAILED DESCRIPTION OF THE PREFERRED EMBODIMENTS

The embodiments of the present invention will be described in detail hereinbelow with reference to the attached drawings. Although the present invention can naturally be used in any system that includes a PCI-type bus, the description will be given for a PC that uses a standard PCI bus to interface with peripherals because the present invention has a structure preferable to such an environment. Additionally, an active low signal is designated by a signal name ending with a "#" symbol. To avoid confusion, the term "assert" indicates that a signal is active and the term "negate" indicates that a signal is inactive. Thus, if an active-low signal SIG# is asserted, its state is the low or "0" voltage level.

1. Overall System

Figure 1:
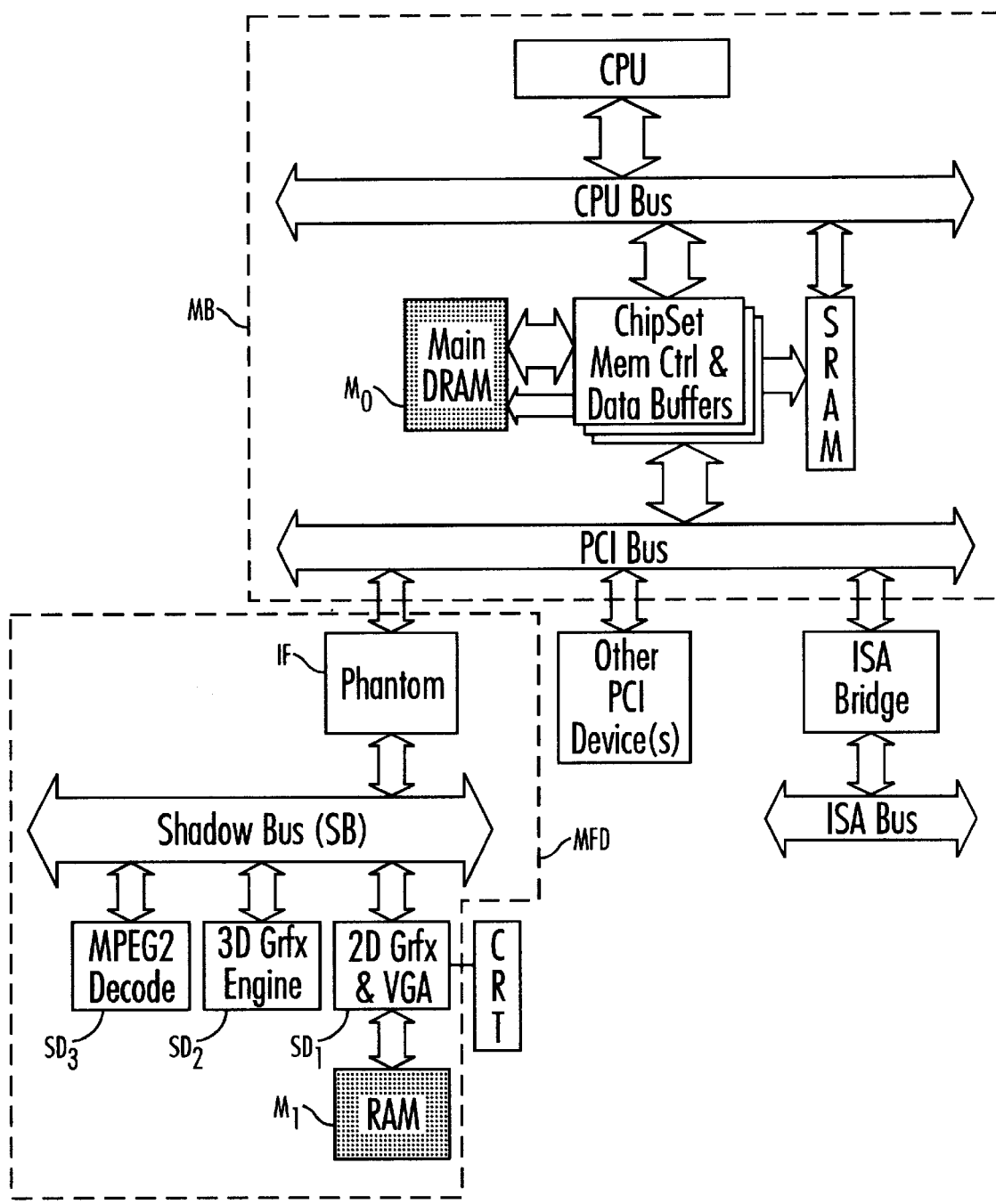
FIG. 1 is a block diagram of the arrangement of a system that includes a host CPU and an embodiment of the present invention.

FIG. 1 shows a block diagram of the arrangement of a system that includes a host CPU and an embodiment of the present invention. A PC is implemented on a motherboard MB and includes a central processing unit CPU and its associated main memory M0, which is typically a large block of DRAM. A cache of fast memory SRAM, logic control chip set, and CPU bus are also provided on the motherboard MB along with a PCI bus. Peripheral devices (SD1, SD2, and SD3) are connected to a secondary bus SB, which is referred to as the Shadow Bus. In this example, the peripherals consist of an MPEG2 decoder SD3, a 3-D graphics accelerator SD2, and a combination 2-D graphics accelerator and VGA controller SD1. An interfacing device IF, which is referred to as the Phantom device, is provided between the Shadow Bus SB and the motherboard PCI bus. The Phantom device IF, Shadow Bus SB, and connected peripherals SD are collectively referred to as the multifunction peripheral device MFD. Additionally, the VGA controller SD1 is connected to a monitor CRT. Various other PCI-based peripheral devices and an ISA bridge may also be connected to the PCI bus.

Figure 2:
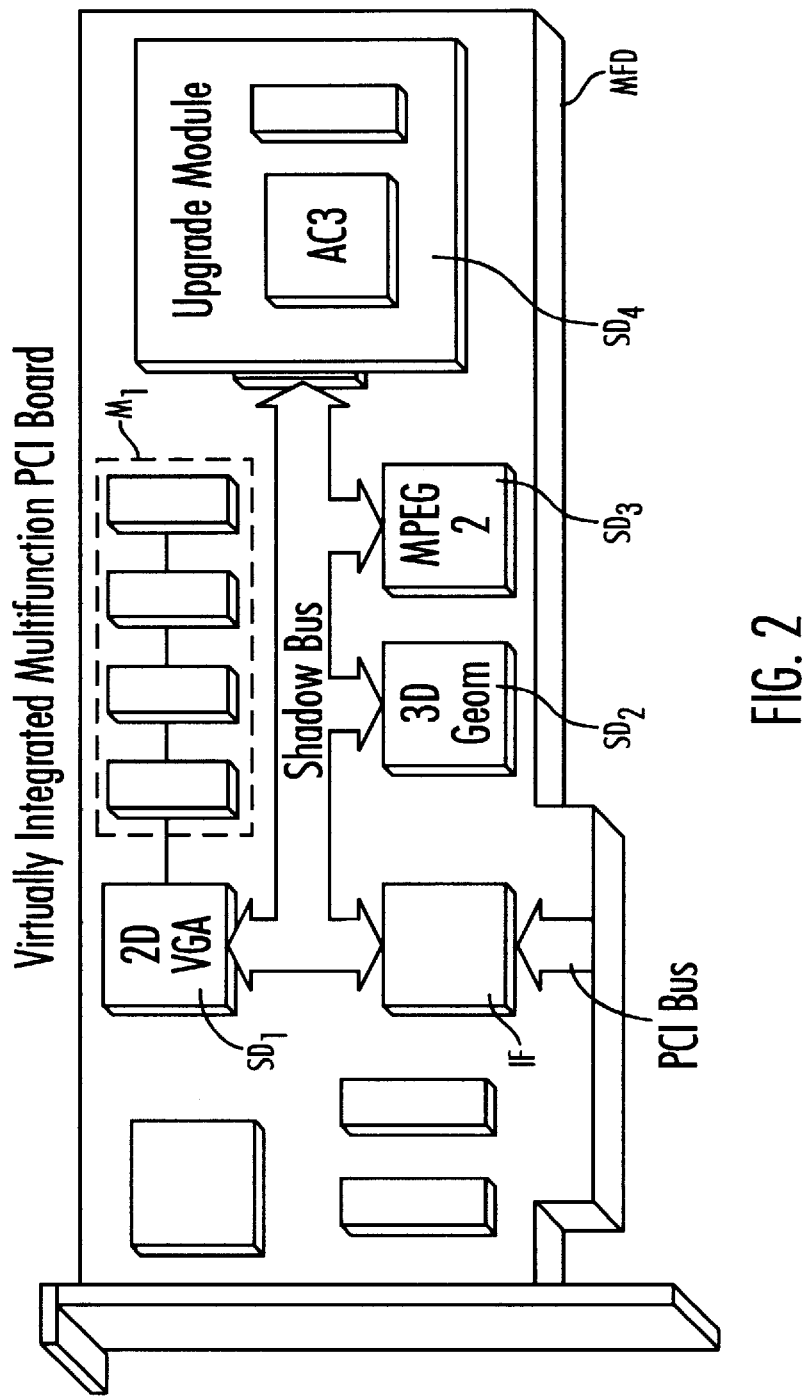
FIG. 2 is a structural diagram of an embodiment of the multifunction peripheral device shown in FIG. 1.

FIG. 2 shows a structural diagram of an embodiment of the multifunction peripheral device MFD shown in FIG. 1.

In this embodiment, the multifunction device is constructed as an add-in card for connection to a slot on the motherboard PCI bus. The card includes a frame buffer memory space M1 that can be accessed by any of the devices connected to the Shadow Bus.

In a first embodiment of the present invention, up to four Shadow Bus devices SD can be connected to the Shadow Bus. The Phantom device IF presents itself to the host CPU as a single multifunction device that performs the functions of the devices connected to the Shadow Bus. The Phantom device then monitors all transactions on both the Shadow Bus and the motherboard PCI bus and controls any transaction requiring both busses. As can be seen from FIGS. 1 and 2, each Shadow Bus device SD can transfer data to or from another Shadow Bus device SD by using only the Shadow Bus. During such transactions, the Phantom device IF operates to isolate the Shadow Bus from the motherboard PCI bus so that the bus traffic is completely removed from the PCI bus. Additionally, each Shadow Bus device SD can transfer data to or from main memory M0, and the host CPU can transfer data to or from the Shadow Bus devices SD, (through the Phantom device) just as if the Shadow Bus devices were connected directly to the motherboard PCI bus.

2. Interface Device

Figure 3:
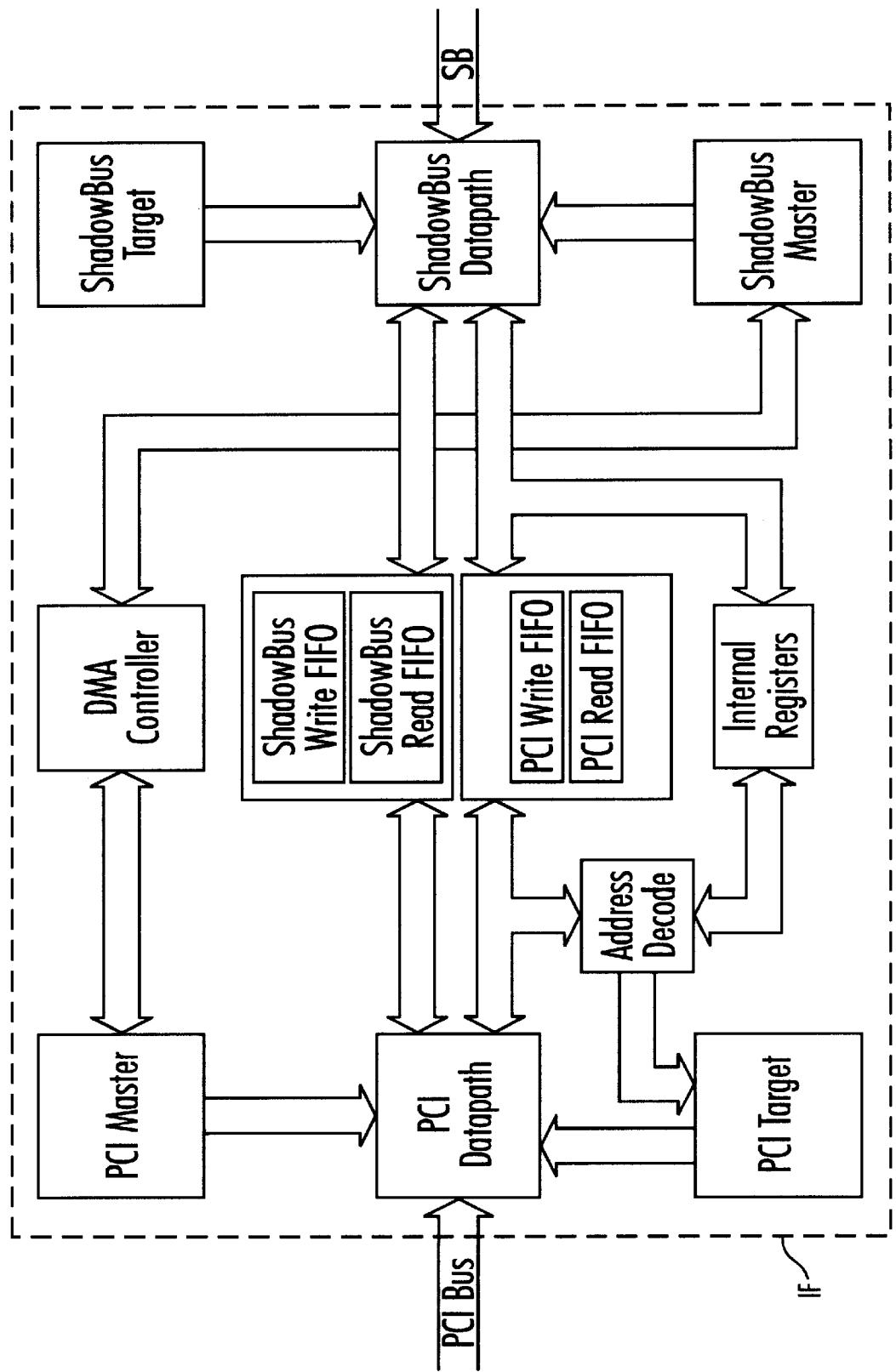
FIG. 3 is a block diagram of an essential portion of the system shown in FIGS. 1 and 2.

FIG. 3 shows a block diagram of the Phantom (interface) device. The motherboard PCI bus interfaces with the Phantom's PCI data path and the Shadow Bus interfaces with the Phantom's Shadow Bus data path. These two data paths interface with one another through four FIFO (first-in, first-out) registers. The Shadow Bus read FIFO and Shadow Bus write FIFO are used for read and write requests and data coming from the Shadow Bus devices. The PCI read FIFO and PCI write FIFO are used for read and write requests and data from the PCI bus. Each of the FIFO registers is, illustratively, 36 bits wide and 9 entries deep. During operation, each entry is used to store the state of the corresponding bus's (multiplexed) address and data lines (32 bits) and command/byte enable lines (4 bits) at appropriate times. The commands associated with the command/byte enable bits are detailed in the PCI specification. Through this configuration, each of the four FIFOs can store an address-command pair and eight double words of data. Actually, any combination of data and addresses can be stored in the nine entries of a FIFO register.

The Phantom device also includes internal registers for storing a map of the address space, priority, and mode of operation for each of the Shadow Bus devices. In the present embodiment, the Shadow Bus can operate in 6 different modes. In modes 0 and 1, the Shadow Bus runs at a 33 MHz clock rate just like the PCI bus. However, in mode 1, a Shadow Bus device can internally double the clock rate by using both the rising and falling edges of the clock signal to transmit data. Similarly, modes 2 and 3 use a 66 MHz clock rate with mode 3 allowing double edge operation, and modes 4 and 5 use a 132 MHz clock rate with mode 5 allowing double edge operation. In the double edge modes (1, 3, and 5), the Phantom device's internal mode registers store data indicating whether or not each Shadow Bus device supports the double edge mode. In this way, standard devices can function together with double edge mode devices on the Shadow Bus side of the Phantom device.

Another register of (or control signal to) the Phantom device can signal the Phantom device to perform endian conversion. If the register is set, the Phantom device swaps the byte lanes when transferring data between the Shadow Bus and PCI bus. This allows little-endian Shadow Bus devices to operate with a big-endian host system regardless of whether the Shadow Bus devices support both modes of operation. A detailed explanation of the Phantom device's internal address space and priority registers is given below.

Additionally, the Phantom device contains state machines to allow it to act as a target or master on either bus. These state machines control the flow of data through the Phantom device and operate to provide the proper control signals on the corresponding busses according to the PCI specification. For example, the PCI target state machine operates to provide proper data and control signals on the PCI bus when a read or write operation from a device connected to the PCI bus is directed to a Shadow Bus device. Similarly, the PCI master operates along with the Phantom device's DMA controller to allow the Phantom device to request the PCI bus and master a PCI bus transaction on behalf of a Shadow Bus device. The DMA controller itself includes two sets of source, destination, and transfer status registers so that two DMA transfers can be handled back-to-back. The transfer status registers store information on bytes remaining, source increment or decrement, and destination increment or decrement. The master and target state machines and the DMA controller allow the Phantom device to implement standard PCI commands. The content of these state machines is described below by Phantom device function.

3. Device Configuration

Figure 4:
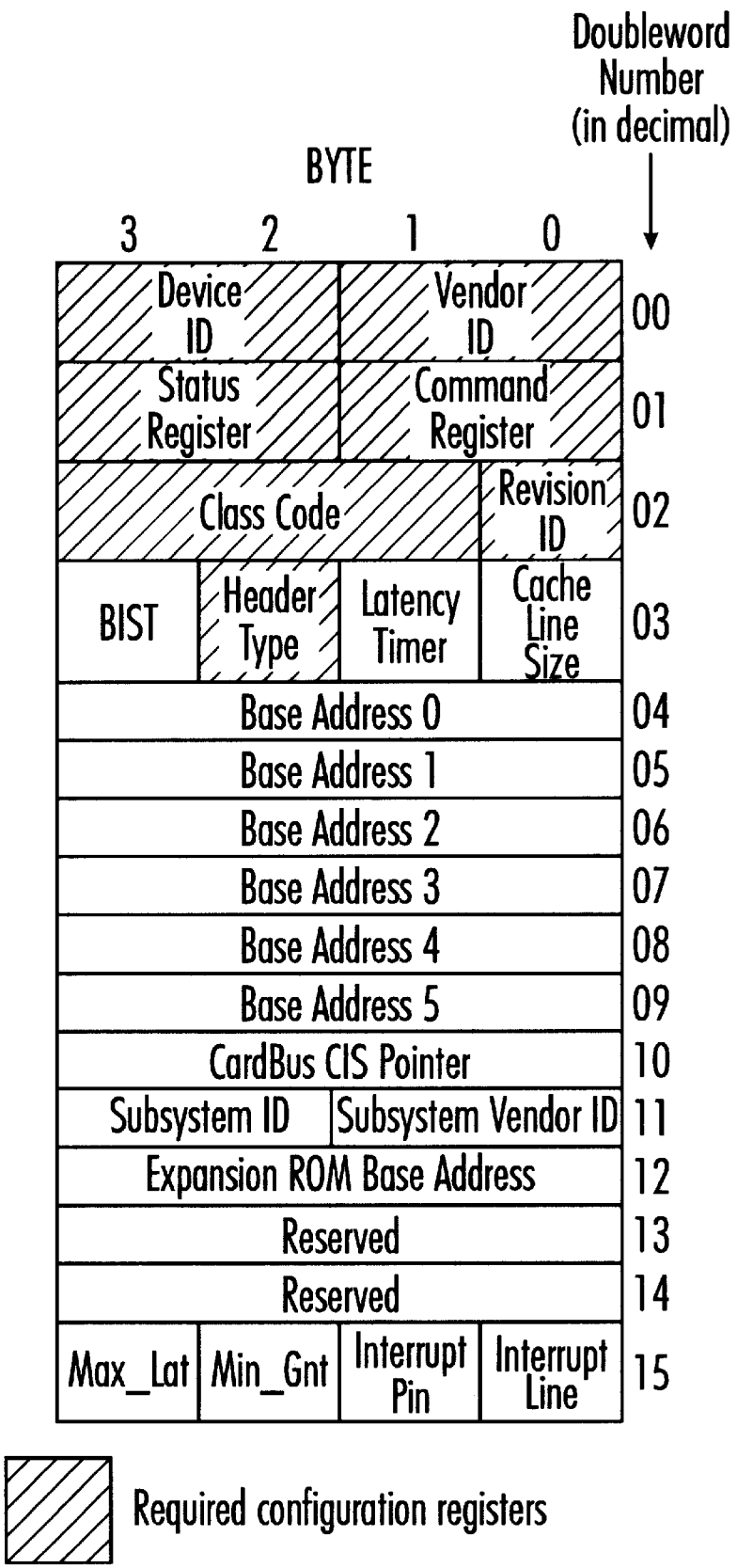
FIG. 4 is a block diagram showing the format of a PCI configuration space in accordance with the PCI specification.

The detailed operation of the Phantom device and Shadow Bus will now be explained. The PCI specification requires a single function device to have one PCI configuration space and a multiple function device to have one PCI configuration space per function. As shown in FIG. 4, the PCI specification details the information that is to be contained in a PCI configuration space. The configuration space contains base address registers that are used by the host CPU to map the address spaces of each of the devices on the PCI bus. At power up or reset, the host CPU must map the address spaces of devices connected to the PCI bus into non-conflicting address ranges. This is typically done by reading the initial base addresses from the configuration space of each device connected to the PCI bus and calculating the size of each address space. To calculate the size of an address space, the host CPU attempts to write all "1"'s into the base address register. Because this register stores the base address for an address space, a certain number of the least significant bits in the register will be hardwired to "0" depending on the size of the associated address space. (For example, if the address space contains 1 "Meg" of data addresses, the 20 least significant bits in the base address register will be hardwired to "0.")

After writing all "1"'s, the host reads the base address that was actually written into the register and counts the number of "0"'s in the address. From the number of "0"'s, the host can calculate the size of the address space (i.e., size=$2^n$, where n=number of "0"'s). The host uses the initial base addresses and sizes to re-map any conflicting address ranges so that each address space has unique addresses. After re-mapping the address spaces, the new (non-conflicting) base addresses for the address spaces are written into the base address registers for the devices. During this configuration, the host CPU communicates with a selected device by asserting its select line IDSEL and if present, the device responds by asserting the DEVSEL# line. After configuration is complete, any address on the bus is unique to one device so the select lines IDSEL do not have to be used to communicate with the proper device.

During the configuration process, the Phantom device presents itself to the host CPU as a single multifunction device that performs the functions of the devices connected to the Shadow Bus. To do this, the Phantom device must go through an "intelligent device configuration" process so that it can properly respond to the host CPU's configuration reads and writes. FIGS. 5A through 5D show flowcharts of the intelligent configuration process performed in the present invention.

Figure 5A:
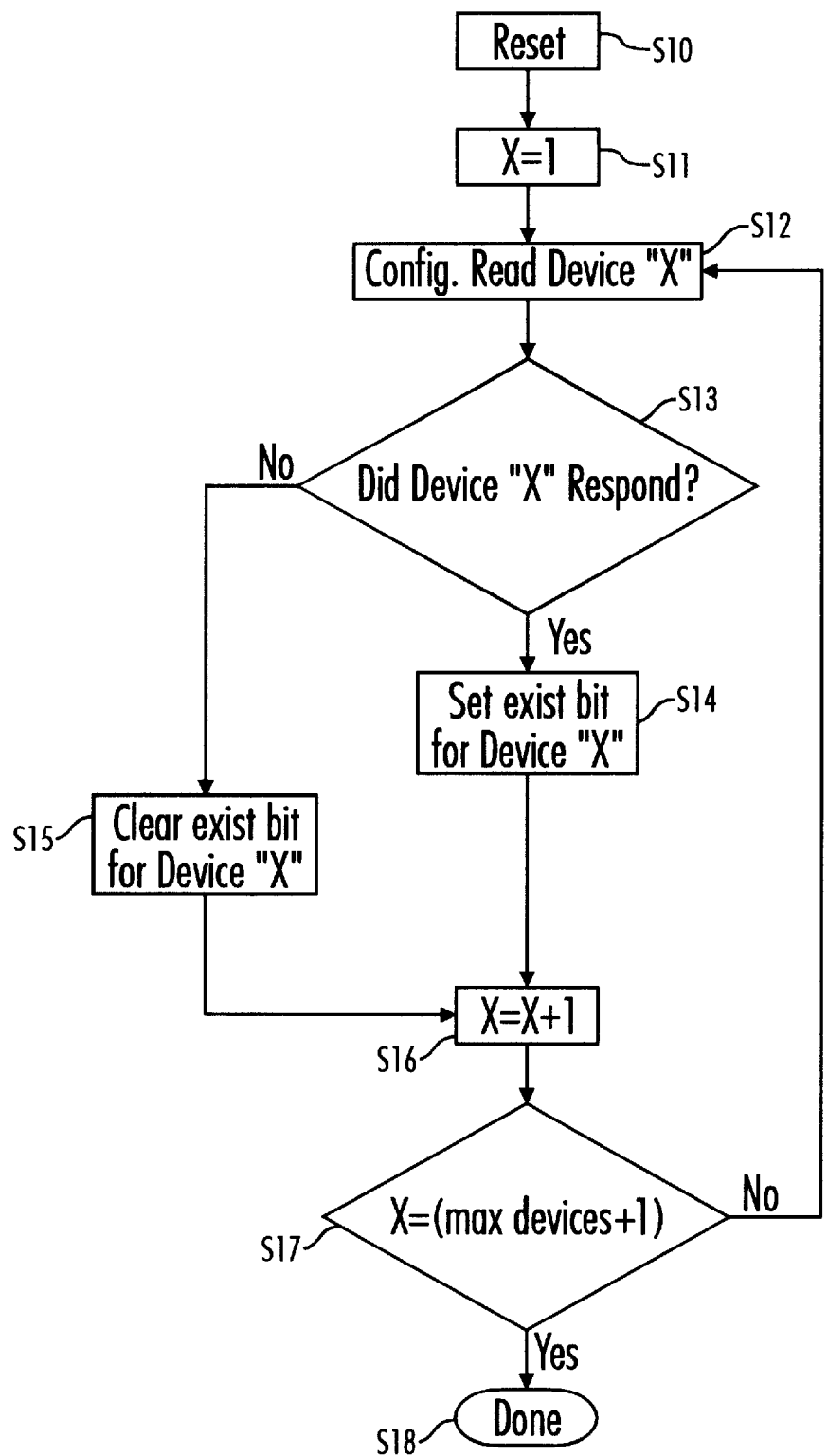
FIGS. 5A, 5B, 5C, and 5D are flowcharts of the intelligent configuration process performed by an embodiment of the present invention.

First, the Phantom device performs its own "fake" configuration sequence on the Shadow Bus devices at power up or reset, step S10 (FIG. 5A). After resetting all the Shadow Bus devices, the Phantom device starts with the first Shadow Bus device, step S11, and issues a configuration read while asserting its select line SIDS1, step S12. Then, the Phantom device determines if the device responds by asserting the Shadow Bus DEVSEL# line, step S13. If the device responds, the exist bit for device 1 is set in the Phantom device's internal registers, step S14. On the other hand, if the device does not respond, the Phantom device determines that the device does not exist and clears the corresponding exist bit, step S15. Next, the Phantom device goes on to the next SB device, step S16, and issues a configuration read while asserting its select line SIDS2. These steps are repeated until the existence or non-existence of each Shadow Bus device has been determined, step S17. In this embodiment, up to four devices can be connected to the Shadow Bus so the steps are repeated four times.

Figure 5B:
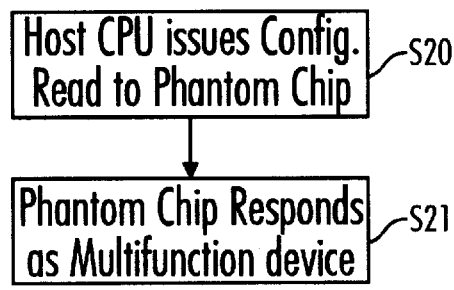
Figure 5C:
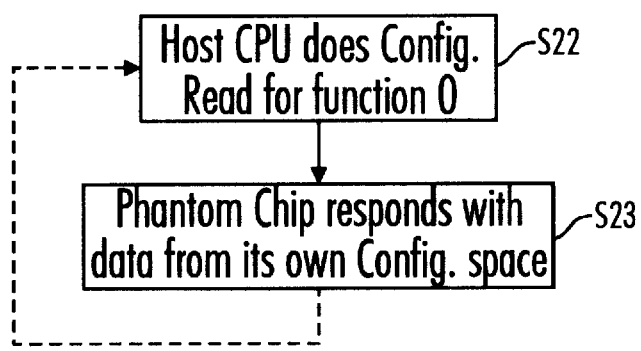
Figure 5D:
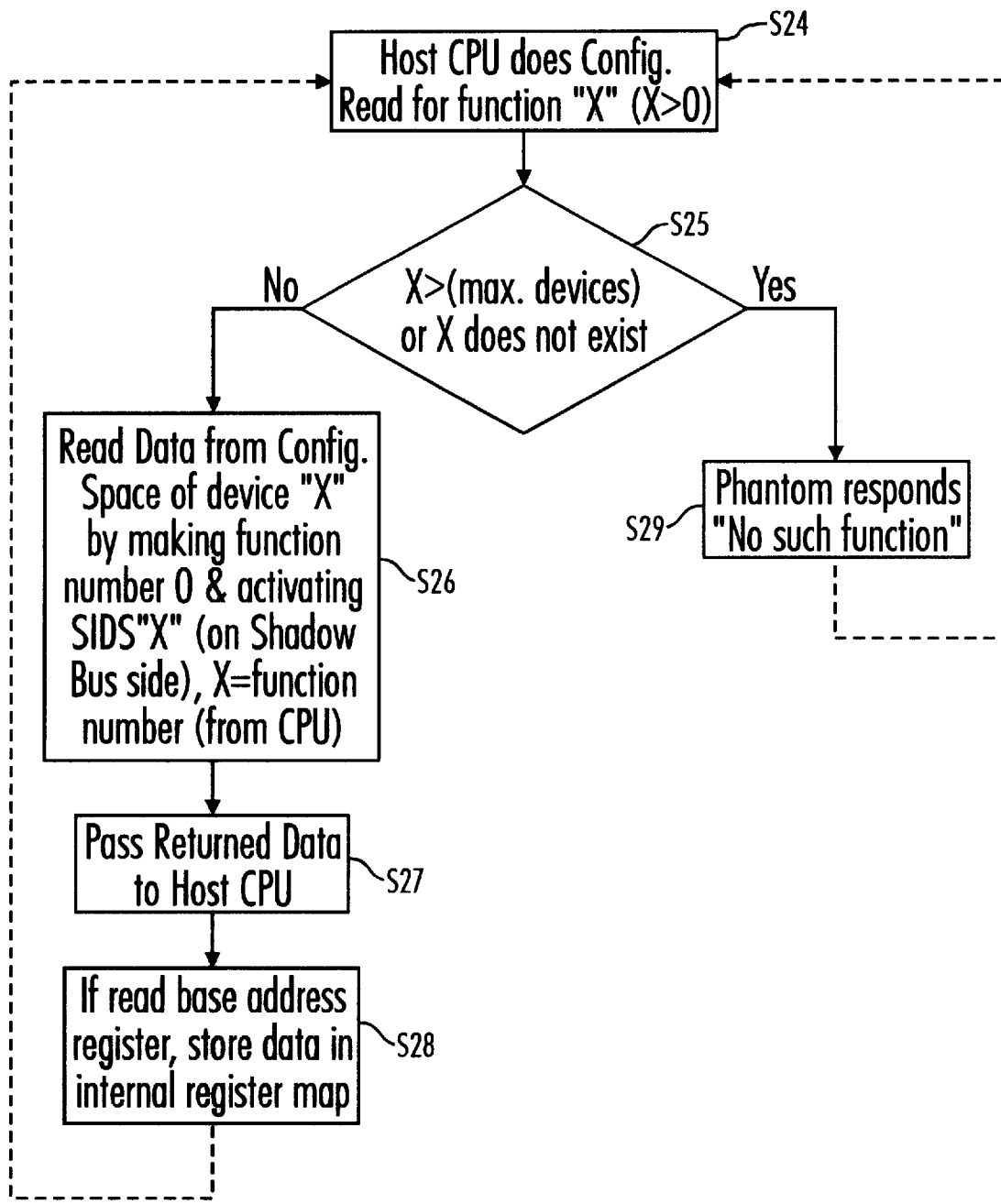
Figure 6:
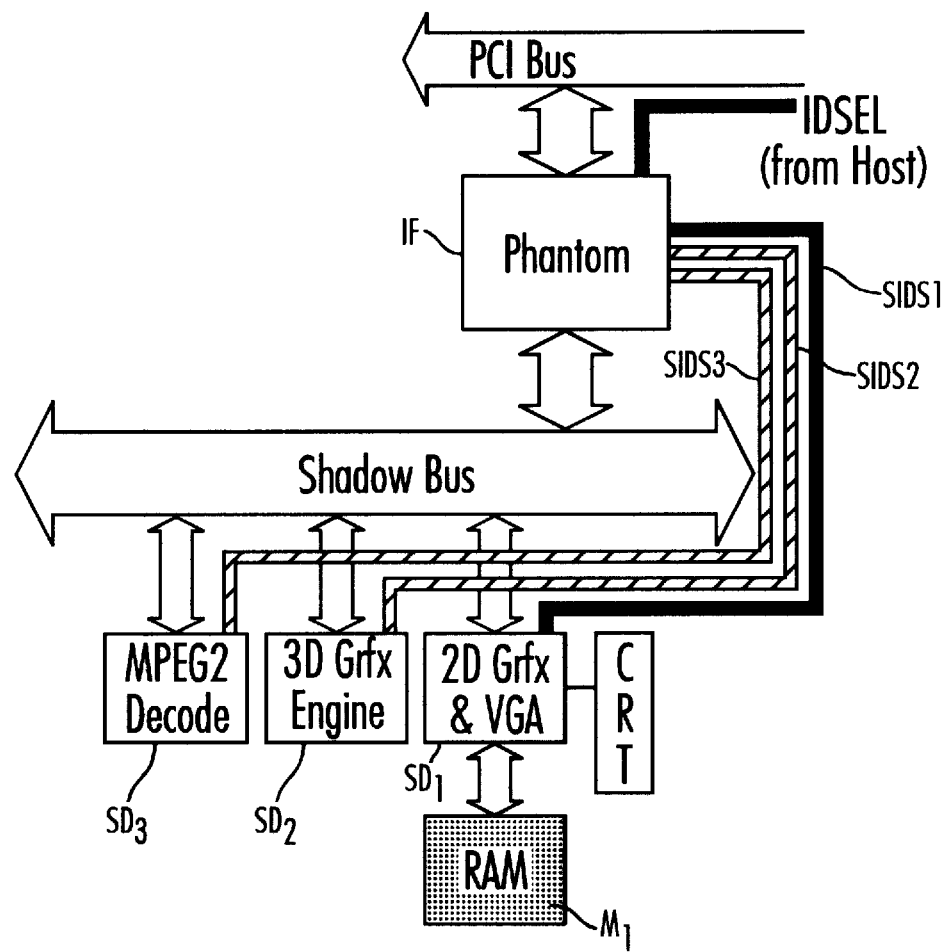
FIG. 6 is a block diagram showing an example of a configuration read in an embodiment of the present invention.

Later, the host CPU performs its configuration sequence to configure the devices connected to the PCI bus, as explained above. At some point in this sequence, the CPU will issue a configuration read to the Phantom device, step S20 (FIG. 5B). The Phantom device responds to this request by presenting itself as a multifunction device, step S21. Then, the CPU issues a configuration read for function 0 of the Phantom device, step S22 (FIG. 5C). Because the Phantom device itself is always assigned function 0, the Phantom device returns the requested data from its own configuration space, step S23. When the configuration sequence is finished with respect to function 0, the host CPU issues a configuration read for function 1 of the phantom device, step S24 (FIG. 5D). If Shadow Bus device 1 exists, step S25, the Phantom device passes the configuration read on to Shadow Bus device 1 by issuing the configuration read on the Shadow Bus with the function number set to 0, while asserting the select line SIDS1 for the device, step S26 (the address from the CPU for the configuration read contains the function number and register number for the read). As an example, FIG. 6 shows the state of the respective select lines for a configuration read of Shadow Bus function 1. In FIG. 6, an asserted select line is shown as a solid line and a negated (or non-asserted) select line is shown as a hatched line.

When Shadow Bus device 1 responds with the requested data from its configuration space, the Phantom device passes the data on to the host CPU over the PCI bus, step S27. The Phantom device also uses this data to build its internal address map for the Shadow Bus devices, step S28. More specifically, the Phantom device's internal address space registers include 16 pairs of base address and size registers (FIG. 7). This provides four pairs of registers for each of the four Shadow Bus devices so that the base address and size of up to four address spaces for each device can be stored. Any time the host CPU issues a configuration read to a Shadow Bus device function to read the base address from one of the first four base address registers in its configuration space, step S24, the Phantom device passes the base address that is returned on to the host, step S27, and stores the base address in its corresponding base address register for the device, step S28.

For example, the host CPU could issue a configuration read to the configuration space for function 2 of the Phantom device requesting the contents of base address register 3 (S24). The Phantom device changes the function number to 0, passes the request onto the Shadow Bus, and asserts the select line SDS2 for Shadow Bus device 2 (S26). When Shadow Bus device 2 returns the requested base address, the Phantom device passes the data on to the PCI bus for the host (S27) and stores the data in its base address register 3 (BAR3) for Shadow Bus device 2 (S28), as shown by the hatch marks in FIG. 7. Similarly, if the host were to issue a configuration write to a base address register for a Shadow Bus device function, the Phantom device would pass the write instruction onto the appropriate Shadow Bus device and store the base address being written into the register in its corresponding base address register.

To calculate the size of an address spaces, the Phantom device looks for the host CPU to do a configuration write of all "1"'s to a base address register. Alter identifying such a write, the Phantom device looks for a subsequent read to the same base address register. When such a write and read sequence is identified, the Phantom device calculates the size of the address space associated with the base address register from the number of "0"'s in the read base address. The calculated size of the address space is stored in the internal size register that is paired with the corresponding base address register. In this way, the Phantom device traps all configuration reads and writes to base address registers of Shadow Bus devices, step S28, to insure that its internal base address and size registers for the devices always contain the proper information.

When the configuration sequence is finished with respect to function 1, the host CPU goes through the configuration sequence for functions 2 through 4 of the phantom device. As shown in FIG. 5D, the Phantom device follows the procedure explained above anytime a configuration read for functions 1, 2, 3, or 4 is received. If the host CPU issues a configuration read for a Phantom device function greater than 4 or for a Shadow Bus device that does not exist, step S25, the Phantom device informs the host that the function does not exist, step S29. All configuration reads issued by the host CPU to the Phantom device (S20, S22, S24) are handled by the Phantom device in the manner shown in FIGS. 5B, 5C, and 5D. Configuration writes to the Phantom device are handled in an analogous manner, except that data is written, instead of being read, and returned to the host. After the host has completed its configuration sequence, normal operation can begin.

4. Memory Sharing and Shadow Bus-to-Shadow Bus Transactions

As described above, one Shadow Bus device can communicate with another Shadow Bus device over the Shadow Bus without requiring access to the motherboard PCI bus. The bus traffic from such Shadow Bus-to-Shadow Bus transactions is removed from the PCI bus so that the limited bandwidth of the PCI bus can be used for other purposes. Also, independent transactions can take place concurrently on the two busses. Shadow Bus-to-Shadow Bus transactions can also take advantage of the increased bandwidth offered on the Shadow Bus due to its higher speed modes. For example, Shadow Bus devices can use both clock edges in mode 1 to transfer data at double the speed offered by the PCI bus.

Because of these features, the Shadow Bus devices can share a common high-speed memory so that each Shadow Bus device does not require its own dedicated, single-function memory. As shown in FIGS. 1 and 2, only the first Shadow Bus device SD1 is provided with a large RAM memory M1 in the first embodiment of the present invention. While the other Shadow Bus devices (SD2, SD3, and SD4) may also have their own dedicated memory, they can also use the common memory M1 for their own purposes. In this way, a Shadow Bus device can access three types of memory—its own device memory, the common memory M1, and the main system memory M0. The availability of the common memory eliminates the need for each device to have its own large single-function memory. Thus, the cost of individual add-on devices is decreased and the system is much more flexible.

In the first embodiment of the present invention, the common memory M1 is the large high-speed frame buffer memory associated with the 2-D graphics and VGA device SDI. This allows Shadow Bus devices to transfer all uncompressed pixel streams over the Shadow Bus without taking up the bandwidth of the PCI bus. For example, with respect to motion video, the host CPU could transfer a 1 MB/s compressed data stream over the PCI bus (and Shadow Bus) to the MPEG2 decoder SD3. After decoding, the MPEG2 decoder can directly transfer the 30 MB/s uncompressed video stream over the Shadow Bus to the on-screen memory portion of the frame buffer M1. Thus, besides offering a higher bandwidth bus, the Shadow Bus can eliminate the need to transfer uncompressed (multimedia) data over the motherboard PCI bus.

In a Shadow Bus-to-Shadow Bus transaction, one of the Shadow Bus devices must be capable of bus mastering (i.e., requesting the bus and generating the necessary signals during the transfer according to the PCI specification). The Phantom device arbitrates competing requests for the Shadow Bus based on device priority (as explained below) and grants the bus to the appropriate requesting device, but does not otherwise interfere during Shadow Bus-to-Shadow Bus transactions. In other words, two Shadow Bus devices communicate over the Shadow Bus in an embodiment of the present invention just as they would communicate over any PCI bus, with the possible exception of double edge clocking. However, the Shadow Bus devices can share a common memory, be granted the bus based on priority, and can operate independently of the motherboard PCI bus.

5. PCI Bus-to-Shadow Bus Transactions

Figure 8:
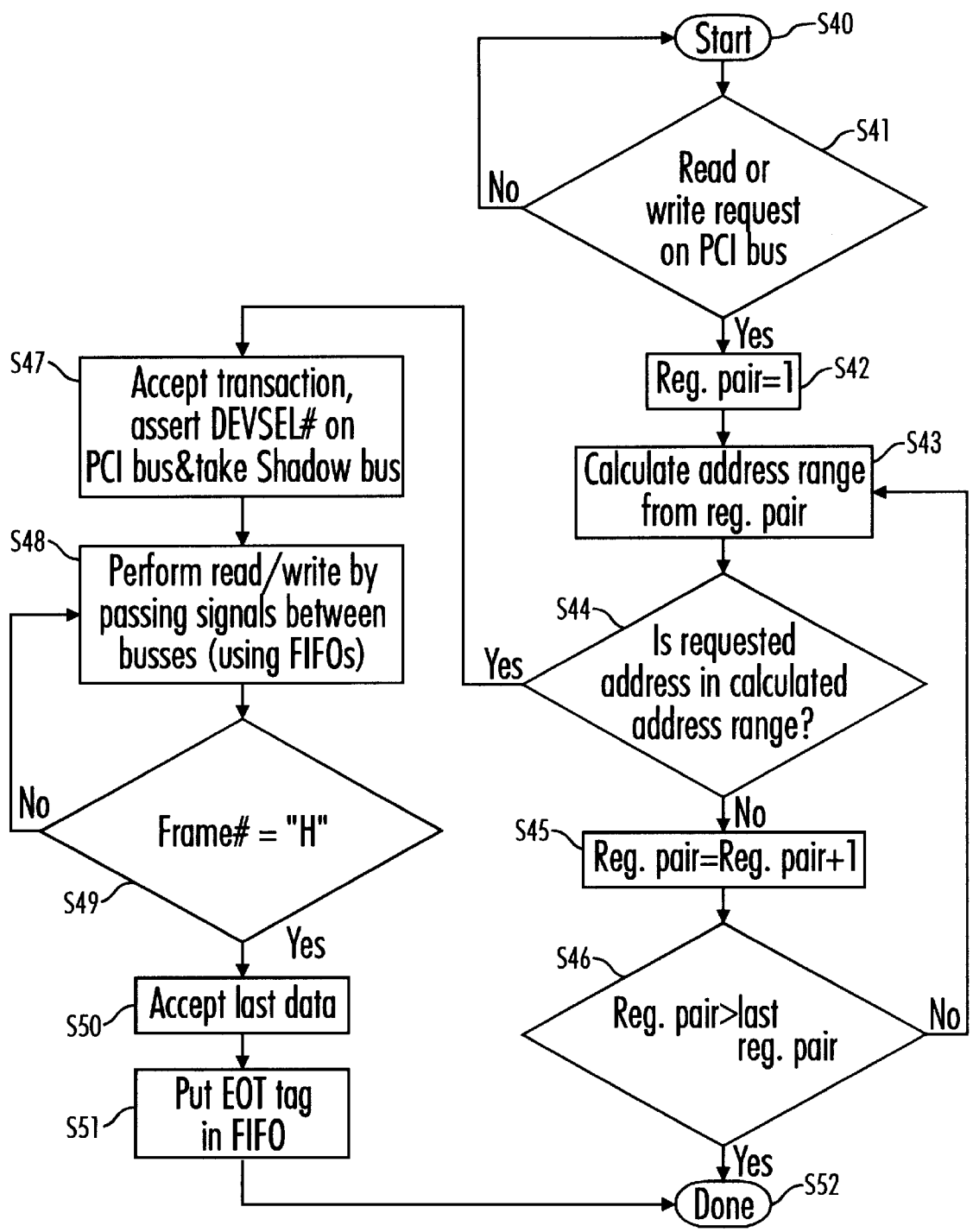
FIG. 8 is a flowchart of the process used to intermediate a first type of bus-to-bus transaction in an embodiment of the present invention.

The host CPU (or another PCI device) can communicate with a Shadow Bus device through the Phantom device. FIG. 8 shows a flowchart of the process used by the Phantom device to intermediate a PCI bus-to-Shadow Bus transaction. During operation, the Phantom device continuously monitors the motherboard PCI bus to see if it contains a read or write request, steps S40 and S41. If there is a read or write request on the PCI bus, the Phantom device checks its internal address map to see if the address requested corresponds to one of the Shadow Bus devices.

In the first embodiment of the present invention, this is accomplished by starting with the Phantom device's first pair of internal base address and size registers, step S42, and calculating the address range given by the register pair, step S43. The Phantom device compares the address from the read or write with the calculated address range, step S44. If the address is not within the address range, the Phantom device moves on to its second base address and size register pair, steps S45 and S46, calculates their corresponding address range, step S43, and compares this with the requested address. As long as the requested address is not within the calculated address range, this process is repeated until each of the 16 register pairs in the Phantom device's internal address map have been checked. If the process reaches register pair 16 and still fails to find an address match, step S44, the Phantom device's entire address map has been checked without finding an address match so the comparison process is ended, steps S45, S46, and S52. The Phantom device concludes that the read or write request on the PCI bus is not intended for a Shadow Bus device so the request is ignored.

On the other hand, if the requested address is within any of the address ranges in the Phantom device's internal address map, step S44, the Phantom device accepts the transaction and asserts DEVSEL# on the PCI bus, step S47. The PCI specification requires that a device claim a transaction within three clock cycles of when the address and command are put on the PCI bus. A "slow" device does not respond until the third cycle and at least a one cycle delay is added by the Phantom device. Thus, if the Phantom device waited for a "slow" Shadow Bus device to respond, DEVSEL# could not be asserted on the PCI bus within the required three clock cycles. When the Phantom device matches an address to its internal address map, it asserts DEVSEL# on the PCI bus and requests access to the Shadow Bus, step S47. In the first embodiment of the present invention, the Phantom device always has the highest priority on the Shadow Bus so it can preempt any current Shadow Bus transfer. Once the Phantom device has access to the Shadow Bus, it initiates the same transfer on the Shadow Bus that was originally requested by the host CPU. The Phantom device then propagates the data phases of the transaction between the two busses, step S48.

More specifically, data is passed between the two busses through the Phantom device's four FIFO registers and the control on the Shadow Bus side of the FIFO registers operates independently of the control on the PCI bus side. Thus, the PCI side control will pass addresses and data destined for the Shadow Bus into a FIFO, steps S47 and S48. When data is being transferred to the FIFO, the control watches for the FRAME# signal to be negated (i.e., go to "H"), step S49. The FRAME# signal goes to "H" to signal that the next piece of data is the last one remaining in the transaction. Thus, when the FRAME# signal goes to "H," the control accepts one more double word of data, step S50, and then inserts an EOT (End of Transaction) tag into the FIFO, step S51. If the FIFO becomes full, the control signals the host to quit sending data. At the same time, the Shadow Bus side control will pass data from the FIFO onto the Shadow Bus for the Shadow Bus device. The control uses the EOT tag to determine when a transaction has finished, step S52.

6. Shadow Bus-to-PCI Bus Transactions

Figure 9:
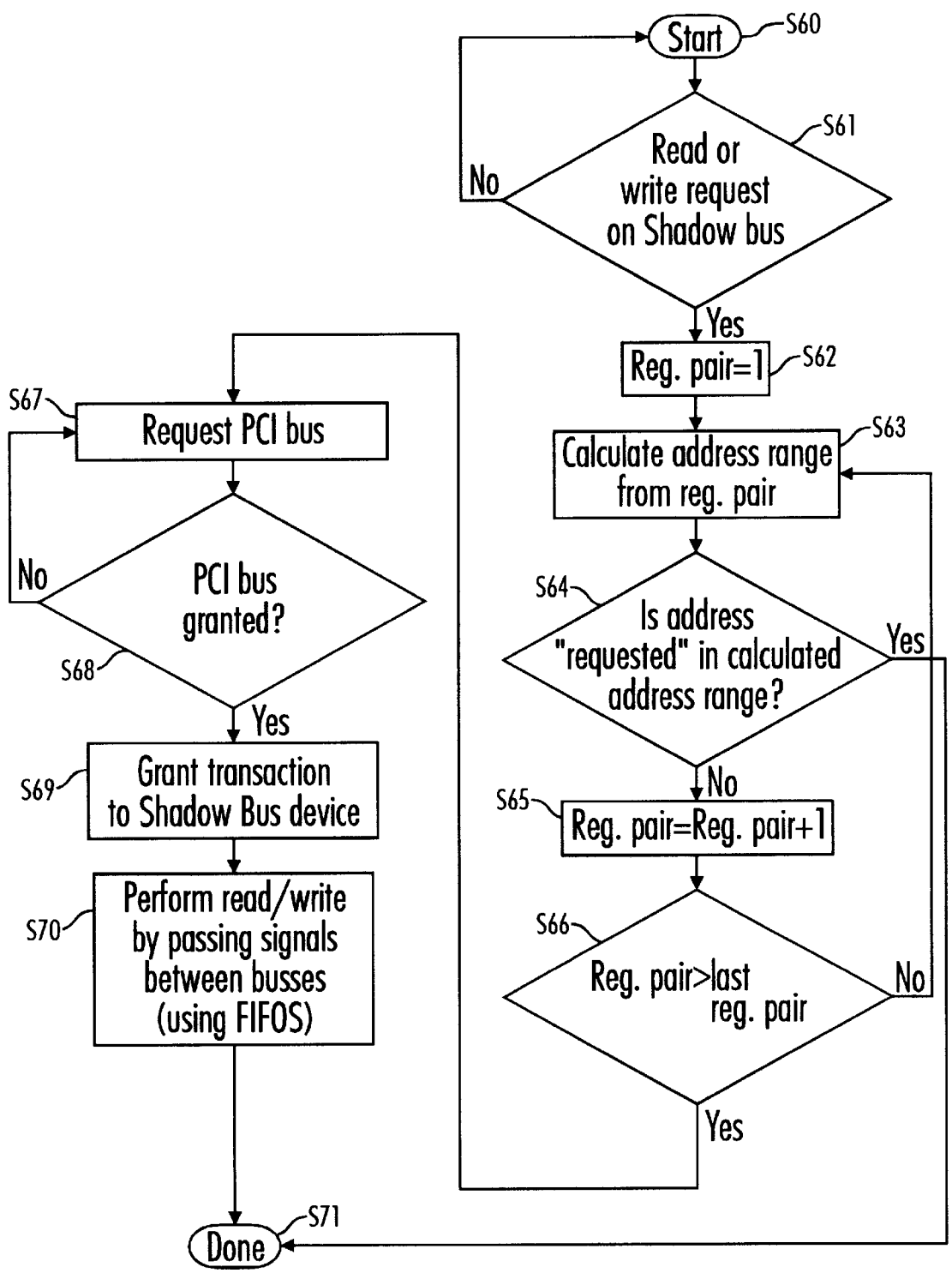
FIG. 9 is a flowchart of the process used to intermediate a second type of bus-to-bus transaction in an embodiment of the present invention.

A Shadow Bus device can access the system main memory M0 (or another PCI device) through the Phantom device. FIG. 9 shows a flowchart of the process used by the Phantom device to intermediate a Shadow Bus-to-PCI bus transaction. During operation, the Phantom device continuously monitors the Shadow Bus to see if it contains a read or write request, steps S60 and S61. if there is a read or write request on the Shadow Bus, the Phantom device checks its internal address map to see if the address requested corresponds to one of the other PCI bus devices.

In the first embodiment of the present invention, this is accomplished by starting with the Phantom device's first pair of internal base address and size registers, step S62, and calculating the address range given by the register pair, step S63. The Phantom device compares the address from the read or write with the calculated address range, step S64. If the address is within the address range, the Phantom device concludes that the read or write request on the Shadow Bus is intended for another Shadow Bus device so the request is ignored, step S71. On the other hand, if the address is not within the address range, the Phantom device moves on to its second base address and size register pair, steps S65 and S66, calculates their corresponding address range, step S63, and compares this with the requested address. As long as the requested address is not within the calculated address range, this process is repeated until each of the 16 register pairs in the Phantom device's internal address map have been checked.

If the process reaches register pair 16 and still fails to find an address match, step S64, the Phantom device's entire address map has been checked without finding an address match so the comparison process is ended, steps S65 and S66. The Phantom device concludes that the read or write request on the Shadow Bus is intended for a PCI bus device and requests access to the PCI bus, step S67. Because access to the PCI bus is arbitrated by a round-robin (i.e., fairness) algorithm, the Phantom device must continue to request the PCI bus until access is granted, steps S67 and S68. Once the Phantom device gains access to the PCI bus, it grants the transaction to the Shadow Bus device, step S69. At this point, the Phantom device propagates the data phases of the transaction between the busses, step S70. Once again, data is passed between the two busses through the Phantom device's four FIFO registers in a manner analogous to that described above for a PCI bus-to-Shadow Bus transaction.

7. Posted Writes and Delayed Reads

Besides standard reads and writes, the Phantom device supports two other types of PCI transfers—posted writes and delayed reads. If a PCI bus-to-Shadow Bus write is requested and the Phantom device decides not to preempt the current Shadow Bus transaction, the Phantom device accepts the address/command and up to 8 double words of data into its incoming FIFO. When the data fills the FIFO, the Phantom device signals the host to stop sending data and that a posted write will be performed with the accepted data. The write transaction is later completed when the Phantom device gains access to the Shadow Bus and passes the address and data through to the Shadow Bus. Thus, for a posted write, the transaction is completed on the originating (PCI) bus before it is completed on the destination (Shadow) bus.

Similarly, if a PCI bus-to-Shadow Bus read is requested and the Phantom device decides not to preempt the current Shadow Bus transaction, the Phantom device accepts the address/command into its incoming FIFO and signals the host that it will perform a delayed read. This tells the host to come back later with the same read request. The read transaction begins later on the Shadow Bus when the Phantom device gains access to the Shadow Bus and passes the address and command through to the Shadow Bus. When the proper Shadow Bus device returns data, the Phantom device puts the address of the read and up to 8 double words of data into its outgoing FIFO. When the FIFO is full, the Phantom device signals the Shadow Bus device to stop sending data. The read transaction is later completed when the host returns with the same read request. At that time, the Phantom device passes the data from the outgoing FIFO through to the PCI bus for the host. In fact, any time the Phantom device receives a read request and the outgoing FIFO contains data, the requested address is checked against the first address in the FIFO. Thus, for a delayed read, the transaction is completed on the destination (Shadow) bus before it is completed on the originating (PCI) bus.

Although it should not happen according to PCI specifications, there is a chance that after the Phantom device performs a delayed read, the address of the following read request from the host will not match the address of the delayed read. In this case, the second read request is accepted in the incoming FIFO but is not acted upon until the host returns with the first address to flush the data out of the outgoing FIFO. When there is a second read request in the incoming FIFO and the Phantom device receives a write request, the second read request is temporarily pushed into a special register. This allows the Phantom device to promptly handle the write request. After the write request is completed, the second read request is returned to the incoming FIFO.

On the other hand, if there is already a second read request in the incoming FIFO, any subsequent read requests to a third address are rejected by the Phantom device. The third read request must be rejected to prevent a write request from lingering in the incoming FIFO because, in this embodiment, the Phantom device has only one temporary register for storing subsequent read addresses when a write request is received. Thus, the Phantom device can handle only two back-to-back reads in a FIFO register. There is also a chance that the host will never return with a read request to the address of the delayed read. To allow recovery from such a situation, the Phantom device's FIFOs can be manually flushed with a special command. In another embodiment, the Phantom device includes a register that counts down from a certain value when data from a delayed read is in the FIFO. Then, if the timer reaches 0, the data is automatically flushed from the FIFO and normal operation continues.

8. Priority Management and Arbitration

The Phantom device uses a dynamic, programmable, priority-based arbiter for granting access to the Shadow Bus. In the first embodiment of the present invention, the Phantom device has an internal 8 bit register that holds the two bit priority assigned to each of the four Shadow Bus devices. Thus, each device can be assigned a priority from 0 to 3, where 0 is the highest priority. The Phantom device itself has a priority higher than 0 so that it can gain access to the Shadow Bus whenever it pleases. During configuration, the Phantom device sets the priority of the Shadow Bus devices according to a predetermined priority sequence. However, the device priorities are dynamic and programmable. The host CPU can reassign the priority of any device at any time during operation. This allows a Shadow Bus device that requires (or comes to require) high bandwidth or quick response time to be given a higher priority so that it will be quickly granted the bus.

For example, if a system has a window containing 3-D graphics in the foreground and a window containing motion video in the background, the host CPU can assign the 3-D graphics accelerator SD2 a higher priority than the MPEG2 decoder SD3. If the positions of the two windows are later switched, the host can then reassign the priorities so that the MPEG2 decoder has a higher priority than the 3-D graphics accelerator. Thus, Shadow Bus devices that have greater bus needs can be guaranteed access to the Shadow Bus, or at least easier access. In contrast, all requests for the PCI bus are handled based only on a fairness algorithm as noted above. Because Shadow Bus access is granted based on a dynamic priority scheme, Shadow Bus devices that currently require a high bandwidth do not have to compete for bus access with other low priority PCI devices, such as joysticks or controllers.

Figure 10:
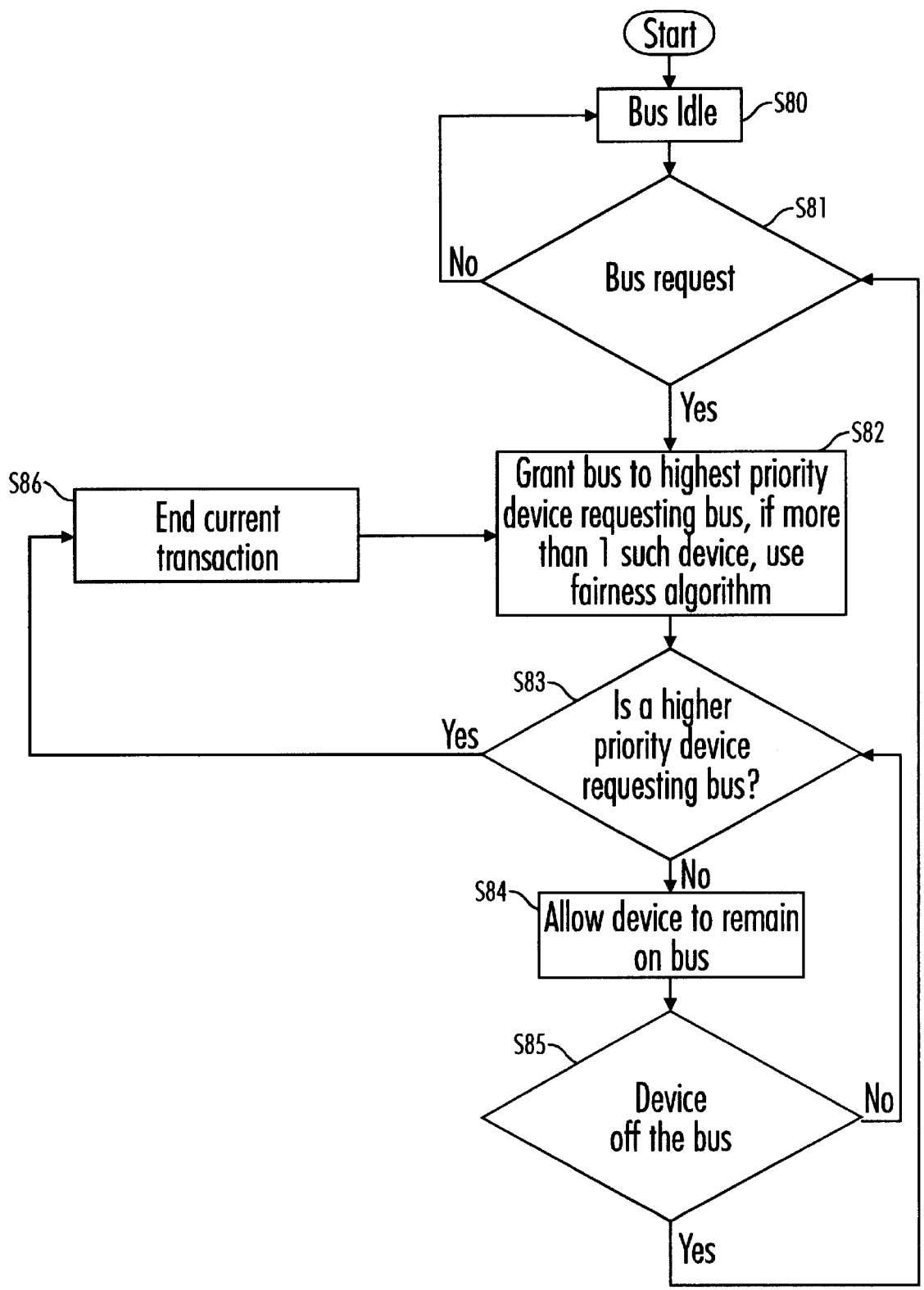
FIG. 10 is a flowchart showing how bus requests are handled in an embodiment of the present invention.
Figure 11:
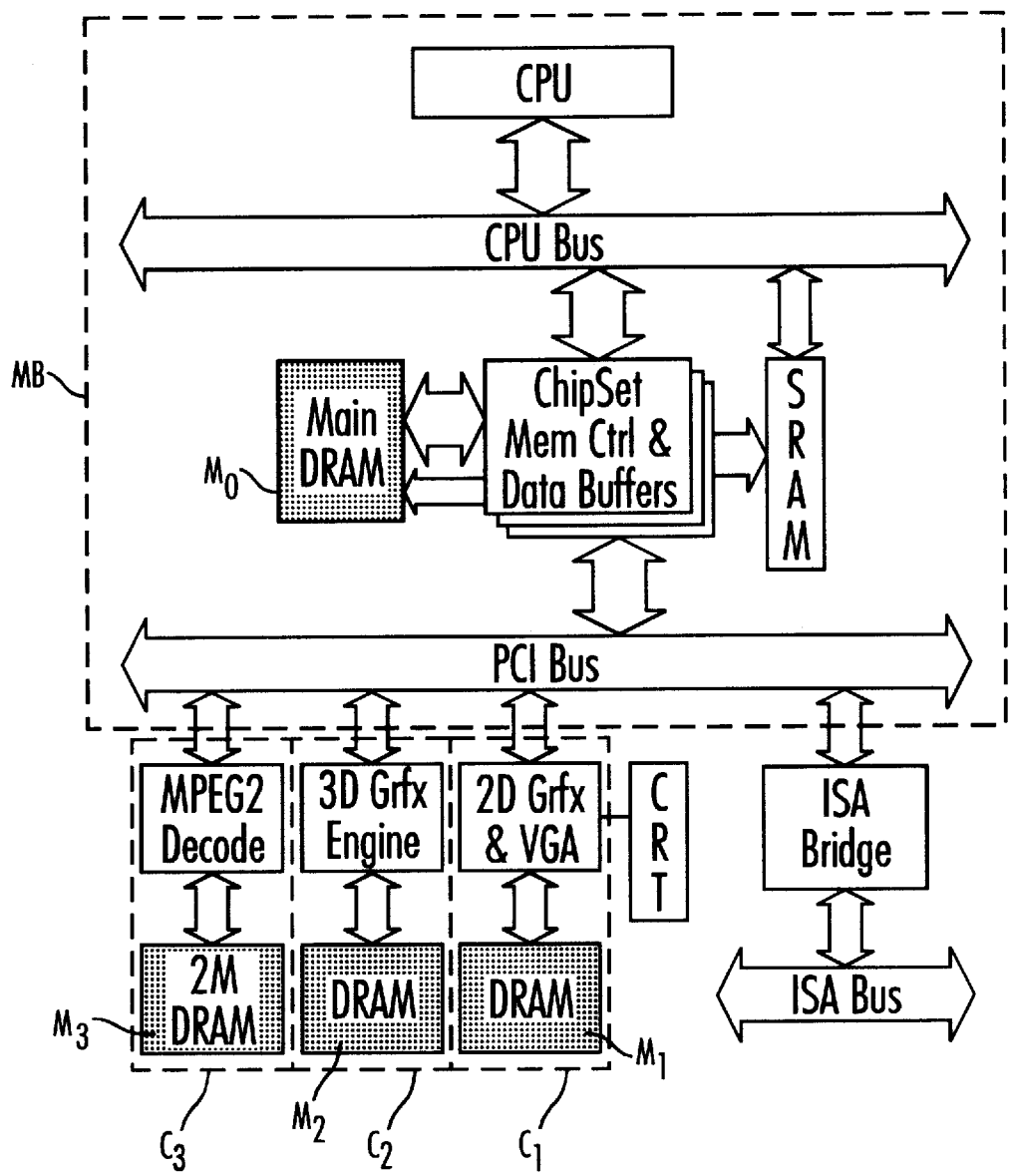
FIG. 11 is a block diagram of the arrangement of a host CPU and add-on peripherals in a conventional PC.

FIG. 10 is a flowchart showing how the Phantom device's arbitration mechanism handles requests for the Shadow Bus.

For purposes of this discussion, note that the Phantom device itself is considered a device that can request the Shadow Bus. Initially, The Shadow Bus is idle, step S80 and the Phantom device waits until a request for the Shadow Bus is issued, step S81. When at least one bus request is received, the Phantom device grants the Shadow Bus to the highest priority device requesting the bus, step S82. If the highest priority request is coming from more than one device, a fairness algorithm is used to decide which of these devices is granted the bus. For example, if two priority 0 devices are requesting the bus, the bus will be granted to one of the devices. Then, when the conflict arises again, the bus will be granted to the other device.

After the Shadow Bus is granted to a device, the Phantom device looks for a request from a higher priority device, step S83. If a higher priority request is received, the Phantom device preempts the current Shadow Bus transaction, step S86, and re-grants the Shadow bus to the highest priority requester just as before, step S82. On the other hand, as long as a higher priority device does not request the Shadow Bus, the Phantom device allows the current transaction to continue, step S84, until it has concluded, step S85. When the current transaction concludes, the Phantom device checks to see if there are any other requests for the Shadow Bus, step S81. If there are not, the bus goes idle, step S80; if there are requests, access is again granted as before, step S82. This priority-based arbitration process is repeated during normal operation of the Phantom device.

In another embodiment of the present invention, the Phantom device contains a 4 bit register that contains a lock bit value for each Shadow Bus device. If the lock bit for a device is set, other requests for the Shadow Bus are ignored once the device has been granted the Shadow Bus. In other words, step S83 is bypassed and the device is guaranteed access to the Shadow Bus until its transaction is completed, step S85. This is useful with audio devices because they are very sensitive and can produce audible tones when abruptly removed from the bus. This feature could also be used to protect "dumb" devices which cannot later complete an interrupted transaction. In yet another embodiment of the present invention, each device including the Phantom device itself is granted a 3 bit priority code. In such an embodiment, the Phantom device does not always have to be the highest priority device.

Naturally, the Phantom device can only use priority in the granting of the Shadow Bus. The Phantom device's access to the PCI bus is still based on a fairness algorithm. For example, if a Shadow Bus device wants to write to system main memory, both Shadow Bus and PCI bus access are required. The Shadow Bus device first must request the Shadow Bus from the Phantom device. When no higher priority device is requesting the Shadow Bus, the Phantom device will grant the request to the Shadow Bus device and duplicate the request to the PCI bus. The Shadow Bus device can send data to the outgoing FIFO while waiting for the PCI bus. When the FIFO becomes full, the Shadow Bus device can insert wait states until it is granted access to the PCI bus so that it can complete its transaction. However, the Phantom device contains a 5 bit programmable latency register for the Shadow Bus. The initial value in the latency register is decreased during a transaction each time the Shadow Bus device inserts a wait state. If the latency register reaches 0, the Phantom device terminates the transaction and the device loses access to the Shadow Bus. The initial latency register value is preset, but can be changed by the host CPU to any value between 0 and 31. The latency register limits the amount of time a device can be "parked" on the Shadow Bus.

As previously explained, the present invention provide a bus interface that enables "virtual integration" of multiple physically distinct peripheral devices so that the collection of devices can function as a single integrated unit. The "virtually integrated" devices can share resources such as a dedicated bus, memory space, and memory bandwidth just as if the devices were physically integrated. Additionally, the intelligent device configuration process and internal memory map allow each peripheral device to be independently added to the system, removed from the system, or upgraded just as if each device was a completely separate peripheral. In this way, flexibility and modularity are maintained while achieving the advantages and memory cost reductions associated with physically integrated devices.

Furthermore, the bus interface device of the present invention provides a dedicated secondary bus that enables multimedia and graphics bus traffic to be isolated from the CPU's primary peripheral bus. This separation allows the CPU's peripheral bus to provide sufficient bandwidth for all peripheral devices and allows room for the system to be upgraded with new or faster peripherals. The dedicated bus can also offer multimedia devices the higher bandwidth they require for applications such as 3-D graphics, digital audio, and motion video. Additionally, the dynamic priority scheme used in one embodiment of the present invention to grant secondary bus access allows a peripheral device to be guaranteed easier bus access.

The embodiments of the present invention described above relate to an add-in card bus interface device for a PC. However, the secondary bus and bus interface device could be implemented on the motherboard along with the CPU. Additionally, the maximum number of devices that can be connected to the secondary bus is merely a matter of design choice. Depending on the situation, the bus interface could easily be adapted to handle more (or less) devices on the secondary bus. Similarly, other design choices, such as the size and number of the FIFO registers or other internal registers could easily be adapted. Likewise, the information stored for the interface device's internal address map could be changed and the method of determining whether a requested address is in the map could be altered. For example, the map could contain starting and ending addresses for each space and/or all of the address spaces in the map could be compared to the requested address simultaneously. Furthermore, embodiments of the present invention may not include all of the features described above. For example, priority arbitration or posted writes and delayed reads may not be required in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A bus interface device for interfacing a secondary peripheral bus with a system having a host CPU and a primary peripheral bus, the secondary peripheral bus allowing connection of a plurality of secondary peripheral devices, said bus interface device comprising:

device determining means for determining secondary peripheral devices that are connected to the secondary peripheral bus;

address range registers for storing address ranges of the plurality of connected secondary peripheral devices;

address determining means for determining whether an address on the primary peripheral bus is an address of one of the connected secondary peripheral devices;

read/write register means for storing addresses and data from the primary peripheral bus determined by the address determining means to be intended for one of the connected secondary peripheral devices;

control means for controlling the flow of addresses and data on the secondary peripheral bus and for controlling the flow of addresses and data stored in the read/write register means onto the secondary peripheral bus; and endian conversion means for allowing swapping of byte lanes when data is passed between the primary peripheral bus and the secondary peripheral bus, wherein the bus interface device presents the secondary peripheral devices to the host CPU as a single integrated device that can perform multiple functions, so as to make the host CPU unaware of the existence of the secondary peripheral bus while making the functions of the secondary peripheral devices accessible to the host CPU.

2. A virtually integrated apparatus for connection to a primary bus of a host computer system, said virtually integrated apparatus allowing a plurality of separate secondary devices including a first secondary device and a second secondary device to be connected to the primary bus, said virtually integrated apparatus comprising:

a secondary bus; a plurality of connection points, each connection point for connecting one of the secondary devices to the secondary bus for allowing the virtually integrated apparatus to perform a function;

an interfacing device connected between the primary bus and the secondary bus;

device determining means for determining secondary devices that are connected to the secondary bus; a plurality of device select lines, each of the device select lines connecting the interface device to one of the secondary devices; and address range registers for storing an address map for the secondary devices, the address map containing information regarding address ranges of the secondary devices, wherein the interfacing device presents the plurality of secondary devices to the host system as a single integrated device that can perform multiple functions, so as to make the host system unaware of the existence of the secondary bus and so as to allow the host system to communicate with the secondary devices as if they were directly connected to the primary bus, the functions performed by the virtually integrated apparatus can be changed by at least one of addition of a third secondary device, removal of the first secondary device, or substitution of the third secondary device for the first secondary device, when the host system issues a configuration command to the virtually integrated apparatus for one of the functions that is actually performed by one of the secondary devices, the configuration command is passed to the secondary bus and the device select line connected to the secondary device that performs the function is activated, and configuration commands passed to the secondary bus are monitored in order to obtain the information regarding address ranges of the secondary devices for the address map.

3. The virtually integrated apparatus as defined in claim 2, further comprising:

address comparing means for using the address map to determine if an address on the primary bus is in the address range of one of the secondary devices;

storage means for storing at least one address or unit of data on the primary bus determined by the address comparing means to be intended for one of the secondary devices; and control means for controlling the flow of contents of the storage means onto the secondary bus.

4. The virtually integrated apparatus as defined in claim 3, wherein the address comparing means signals the host system that the virtually integrated apparatus claims the address on the primary bus when it is determined that the address is intended for one of the secondary devices, and the control means includes means for gaining control of the secondary bus, means for transferring the address stored in the storage means onto the secondary bus, means for determining when one of the secondary devices has claimed the address, and means for passing data between the storage means and the secondary device after the address is claimed in order to complete a transaction that is associated with the address.

5. The virtually integrated apparatus as defined in claim 3, wherein the storage means can store multiple entries, each of the entries being either an address or unit of data from the primary bus that is destined for one of the secondary devices.

6. The virtually integrated apparatus as defined in claim 2, further comprising:

priority register means for storing a plurality of assigned priority values, one stored priority value corresponding to each of the secondary devices; and arbitration means for resolving competing requests for access to the secondary bus based on the priority values of the secondary devices requesting the bus, wherein the priority values assigned to the secondary devices can be changed during normal operation.

7. The virtually integrated apparatus as defined in claim 2, wherein the interfacing means includes endian conversion means for allowing the swapping of byte lanes when data is passed between the primary and secondary busses.

8. The virtually integrated apparatus as defined in claim 2, wherein the secondary bus selectively operates at twice the speed of the primary bus by having secondary devices internally double clock speed by using both rising and falling edges of a clock signal.

9. The virtually integrated apparatus as defined in claim 2, further comprising a common RAM coupled to the secondary bus for use by the secondary devices, the first and second secondary devices each being capable of accessing a host system main RAM, the common RAM, and any dedicated device RAM that is provided.

10. A virtually integrated apparatus for connection to a primary bus of a host computer system, said virtually integrated apparatus allowing a plurality of separate secondary devices including a first secondary device and a second secondary device to be connected to the primary bus, said virtually integrated apparatus comprising:

a secondary bus;

a plurality of connection points, each connection point for connecting one of the secondary devices to the secondary bus for allowing the virtually integrated apparatus to perform a function;

an interfacing device connected between the primary bus and the secondary bus;

address range registers for storing an address map for the secondary devices, the address map containing information regarding address ranges of the secondary devices;

address comparing means for using the address map to determine if an address on the primary bus is in the address range of one of the secondary devices;

storage means for storing at least one address or unit of data on the primary bus determined by the address comparing means to be intended for one of the secondary devices; and control means for controlling the flow of contents of the storage means onto the secondary bus, wherein the interfacing device presents the plurality of secondary devices to the host system as a single integrated device that can perform multiple functions, so as to make the host system unaware of the existence of the secondary bus and so as to allow the host system to communicate with the secondary devices as if they were directly connected to the primary bus, the functions performed by the virtually integrated apparatus can be changed by at least one of addition of a third secondary device, removal of the first secondary device, or substitution of the third secondary device for the first secondary device, configuration commands passed to the secondary bus are monitored in order to obtain the information regarding address ranges of the secondary devices for the address map, the address comparing means signals the host system that the virtually integrated apparatus claims the address on the primary bus when it is determined that the address is intended for one of the secondary devices, and the control means includes means for gaining control of the secondary bus, means for transferring the address stored in the storage means onto the secondary bus, means for determining when one of the secondary devices has claimed the address, and means for passing data between the storage means and the secondary device after the address is claimed in order to complete a transaction that is associated with the address.

11. A virtually integrated apparatus for connection to a primary bus of a host computer system, said virtually integrated apparatus allowing a plurality of separate secondary devices including a first secondary device and a second secondary device to be connected to the primary bus, said virtually integrated apparatus comprising:

a secondary bus;

a plurality of connection points, each connection point for connecting one of the secondary devices to the secondary bus for allowing the virtually integrated apparatus to perform a function; and an interfacing device connected between the primary bus and the secondary bus, the interfacing device including endian conversion means for allowing the swapping of byte lanes when data is passed between the primary and secondary busses, wherein the interfacing device presents the plurality of secondary devices to the host system as a single integrated device that can perform multiple functions, so as to make the host system unaware of the existence of the secondary bus and so as to allow the host system to communicate with the secondary devices as if they were directly connected to the primary bus, and the functions performed by the virtually integrated apparatus can be changed by at least one of addition of a third secondary device, removal of the first secondary device, or substitution of the third secondary device for the first secondary device.

12. A method of interfacing a secondary bus connected to a plurality of separate secondary devices with a primary bus of a host computer system so that the host system can communicate with the secondary devices as if they were directly connected to the primary bus, said method comprising the steps of:

determining secondary devices that are connected to the secondary bus;

informing the host system that all of the secondary devices connected to the secondary bus are one multifunction device;

mapping functions of the each of the secondary devices to functions of the multifunction device;

passing all configuration commands for one of the functions of the multifunction device that is mapped to one of the secondary devices to the secondary device mapped to that function;

isolating the secondary bus from the primary bus so that two of the secondary devices can communicate over the secondary bus independent of activity on the primary bus;

monitoring commands on the primary bus to determine commands destined for the secondary devices; and for each command determined to be destined for one of the secondary devices, passing the command and any associated data onto the secondary bus so it can reach the secondary device, wherein the step of monitoring commands includes the step of comparing command addresses, each of which is associated with a command on the primary bus, with addresses in the address map; and the step of passing includes the steps of:
    signaling the host system that the command is accepted by the multifunction device;
    requesting the secondary bus;
    when access to the secondary bus is granted, passing the command and command address onto the secondary bus; and
    when one of the secondary devices accepts the transaction, passing data either from the primary bus to the secondary device over the secondary bus or from the secondary device over the secondary bus to the primary bus.

13. The interfacing method as defined in claim 12, wherein commands, command addresses, and data are passed from the primary bus to the secondary bus through at least one register so that the primary bus can be freed before passing onto the secondary bus is completed.

14. A method of interfacing a secondary bus connected to a plurality of separate secondary devices with a primary bus of a host computer system so that the host system can communicate with the secondary devices as if they were directly connected to the primary bus, said method comprising the steps of:

determining secondary devices that are connected to the secondary bus;

informing the host system that all of the secondary devices connected to the secondary bus are one multifunction device;

mapping functions of the each of the secondary devices to functions of the multifunction device;

passing all configuration commands for one of the functions of the multifunction device that is mapped to one of the secondary devices to the secondary device mapped to that function;

isolating the secondary bus from the primary bus so that two of the secondary devices can communicate over the secondary bus independent of activity on the primary bus;

monitoring commands on the primary bus to determine commands destined for the secondary devices;

for each command determined to be destined for one of the secondary devices passing the command and any associated data onto the secondary bus so it can reach the secondary device, assigning a priority to each of the secondary devices, the priority of a device being capable of being reassigned at any time; and granting access to the secondary bus to one of the secondary devices based on the priority of the secondary devices that are requesting the secondary bus.

15. A method of interfacing a secondary bus connected to a plurality of separate secondary devices with a primary bus of a host computer system so that the host system can communicate with the secondary devices as if they were directly connected to the primary bus, said method comprising the steps of:

determining secondary devices that are connected to the secondary bus;

informing the host system that all of the secondary devices connected to the secondary bus are one multifunction device;

mapping functions of the each of the secondary devices to functions of the multifunction device;

passing all configuration commands for one of the functions of the multifunction device that is mapped to one of the secondary devices to the secondary device mapped to that function;

isolating the secondary bus from the primary bus so that two of the secondary devices can communicate over the secondary bus independent of activity on the primary bus;

monitoring commands on the primary bus to determine commands destined for the secondary devices;

for each command determined to be destined for one of the secondary devices, passing the command and any associated data onto the secondary bus so it can reach the secondary device; and swapping byte lanes to perform endian conversion when passing data between the primary and secondary busses.

16. A method of interfacing a secondary bus connected to a plurality of separate secondary devices with a primary bus of a host computer system so that the host system can communicate with the secondary devices as if they were directly connected to the primary bus, said method comprising the steps of:

determining secondary devices that are connected to the secondary bus;

informing the host system that all of the secondary devices connected to the secondary bus are one multifunction device;

mapping functions of the each of the secondary devices to functions of the multifunction device;

passing all configuration commands for one of the functions of the multifunction device that is mapped to one of the secondary devices to the secondary device mapped to that function;

isolating the secondary bus from the primary bus so that two of the secondary devices can communicate over the secondary bus independent of activity on the primary bus;

monitoring commands on the primary bus to determine commands destined for the secondary devices;

for each command determined to be destined for one of the secondary devices, passing the command and any associated data onto the secondary bus so it can reach the secondary device; and operating the secondary bus at twice the speed of the primary bus by having devices connected to the secondary bus internally double clock speed by using both rising and falling edges of a clock signal.

17. A method of interfacing a secondary bus connected to a plurality of separate secondary devices with a primary bus of a host computer system so that the host system can communicate with the secondary devices as if they were directly connected to the primary bus, said method comprising the steps of:

determining secondary devices that are connected to the secondary bus:

informing the host system that all of the secondary devices connected to the secondary bus are one multifunction device;

mapping functions of the each of the secondary devices to functions of the multifunction device;

passing all configuration commands for one of the functions of the multifunction device that is mapped to one of the secondary devices to the secondary device mapped to that function;

isolating the secondary bus from the primary bus so that two of the secondary devices can communicate over the secondary bus independent of activity on the primary bus;

monitoring commands on the primary bus to determine commands destined for the secondary devices;

for each command determined to be destined for one of the secondary devices, passing the command and any associated data onto the secondary bus so it can reach the secondary device; and providing a common RAM that is coupled to the secondary bus and can be accessed by the secondary devices so that each of the secondary devices can access a host system main RAM, the common RAM, and any dedicated device RAM that is provided.

18. A method of interfacing a secondary bus connected to a plurality of separate secondary devices with a primary bus of a host computer system so as to allow the host system to communicate with the secondary devices as if they were directly connected to the primary bus, said method comprising the steps of:

determining secondary devices that are connected to the secondary bus;

presenting all of the secondary devices connected to the secondary bus to the host system as a single integrated device that can perform multiple functions, so as to make the host system unaware of the existence of the secondary bus;

mapping functions of the each of the secondary devices to functions of the single integrated device;

passing all configuration commands for one of the functions of the single integrated device that is mapped to one of the secondary devices to the secondary device mapped to that function; and swapping byte lanes to perform endian conversion when passing data between the primary and secondary busses.

* * * * *